US005905327A

United States Patent [19]
Ooi et al.

[11] Patent Number: 5,905,327
[45] Date of Patent: May 18, 1999

[54] MULTI-FUNCTIONAL ULTRASONIC MOTOR AND APPARATUS USING THE SAME

[75] Inventors: Kazushige Ooi, Fujisawa; Toyokazu Aizawa, Yokohama, both of Japan

[73] Assignee: Kabushiki Kaisha Toshiba, Kawasaki, Japan

[21] Appl. No.: 08/868,805

[22] Filed: Jun. 4, 1997

[30] Foreign Application Priority Data

Jun. 5, 1996 [JP] Japan .................................. 8-143093

[51] Int. Cl.⁶ ...................................................... H01L 41/08
[52] U.S. Cl. ......................... 310/328; 310/366; 310/369; 310/323
[58] Field of Search ................................ 310/369, 365, 310/323, 331, 366

[56] References Cited

U.S. PATENT DOCUMENTS 4,935,659  6/1990  Naka et al. ............................ 310/328
5,323,082  6/1994  Wright .................................... 310/328

FOREIGN PATENT DOCUMENTS

4427760A1  2/1996  Germany .
3-203572   9/1991  Japan .
6-51181    2/1994  Japan .
2088645    6/1982  United Kingdom .

Primary Examiner—Mark O. Budd
Attorney, Agent, or Firm—Pillsbury Madison & Sutro LLP

[57] ABSTRACT

A motor itself has multi-functions to be able to drive a plurality of objects to be controlled, so that the whole apparatus is compact and provided at low cost. The rotation planes of first and second rotating units B1 and B2 are faced with each other to make these planes in a mutually pressed state. A current is supplied to a piezoelectric element provided on the rotation plane of any one or both of the first and second rotating units, and the rotation of any one of the first and second rotating units is selectively stopped by pressing members, so that any one of the rotating units can be selectively rotated.

14 Claims, 16 Drawing Sheets

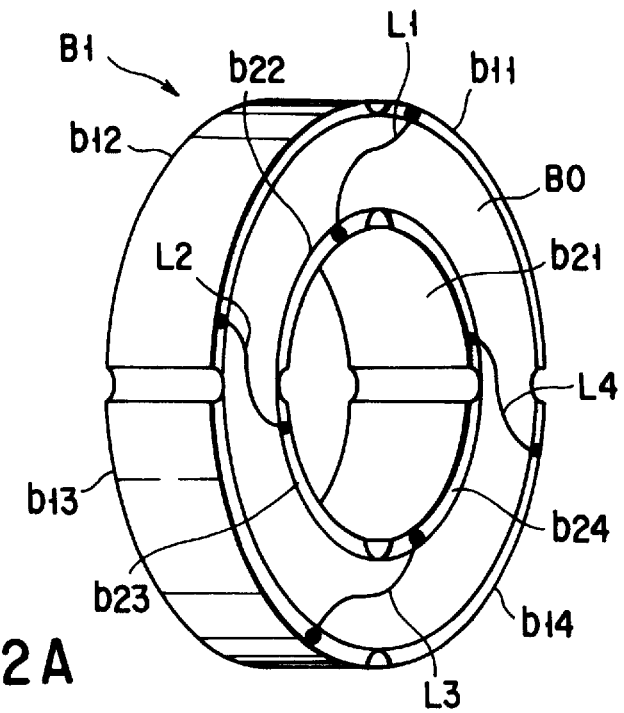
FIG. 2A
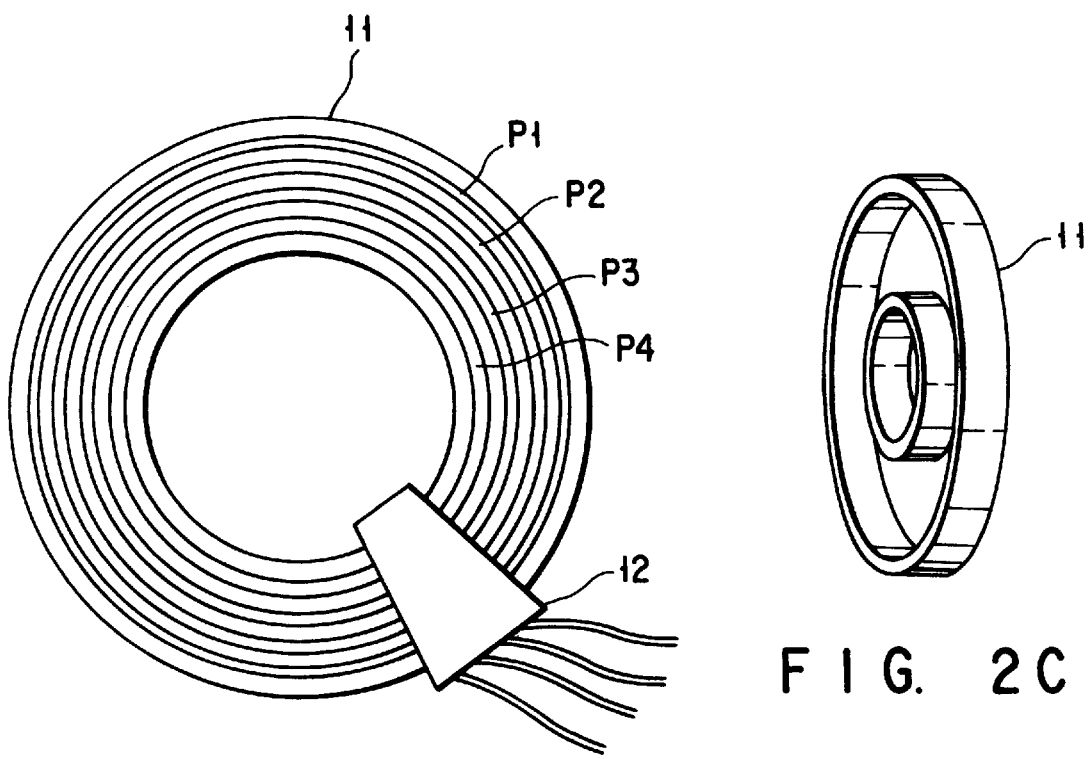
FIG. 2B
FIG. 2C

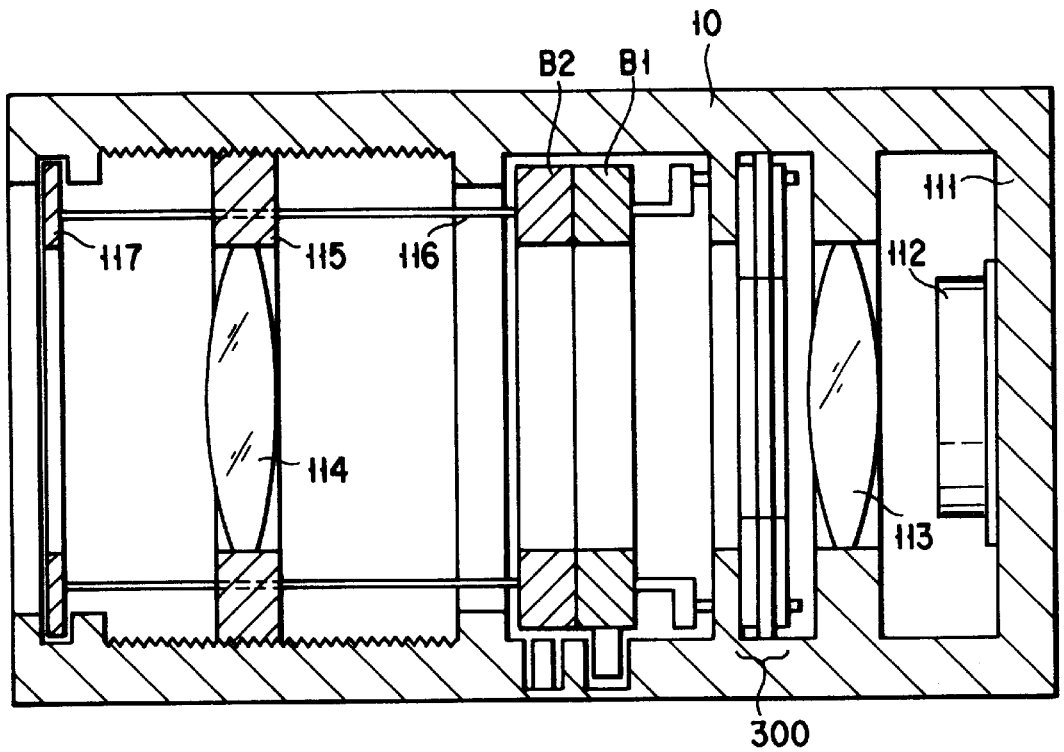
F I G. 5
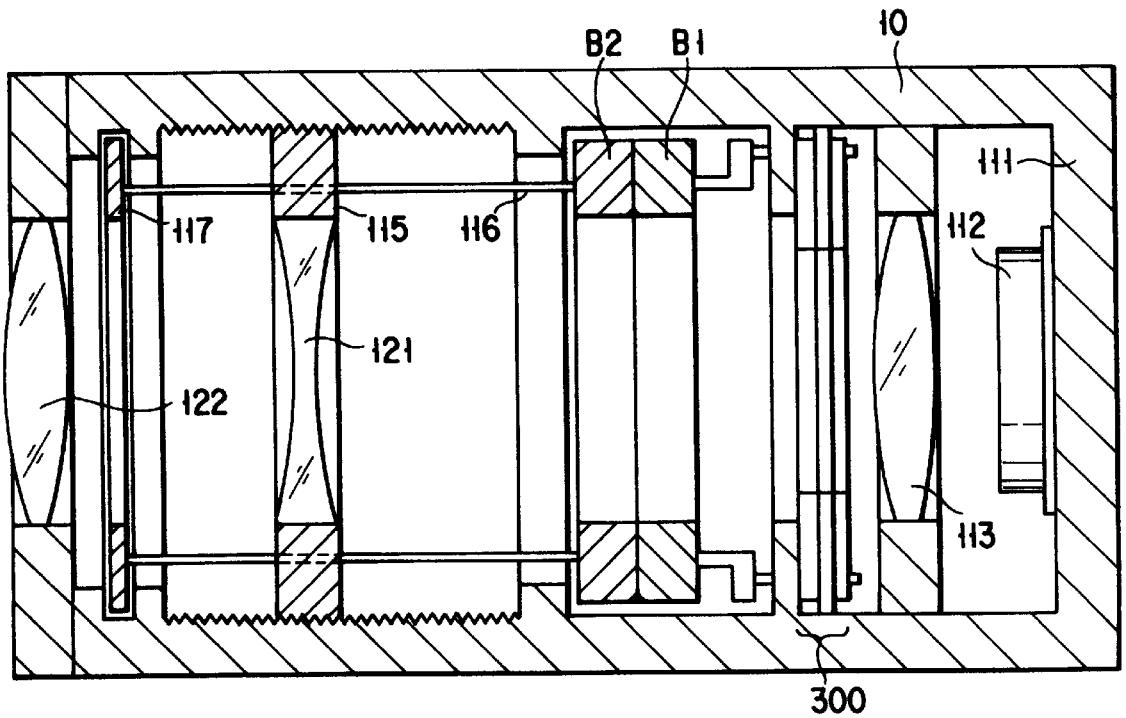
F I G. 6

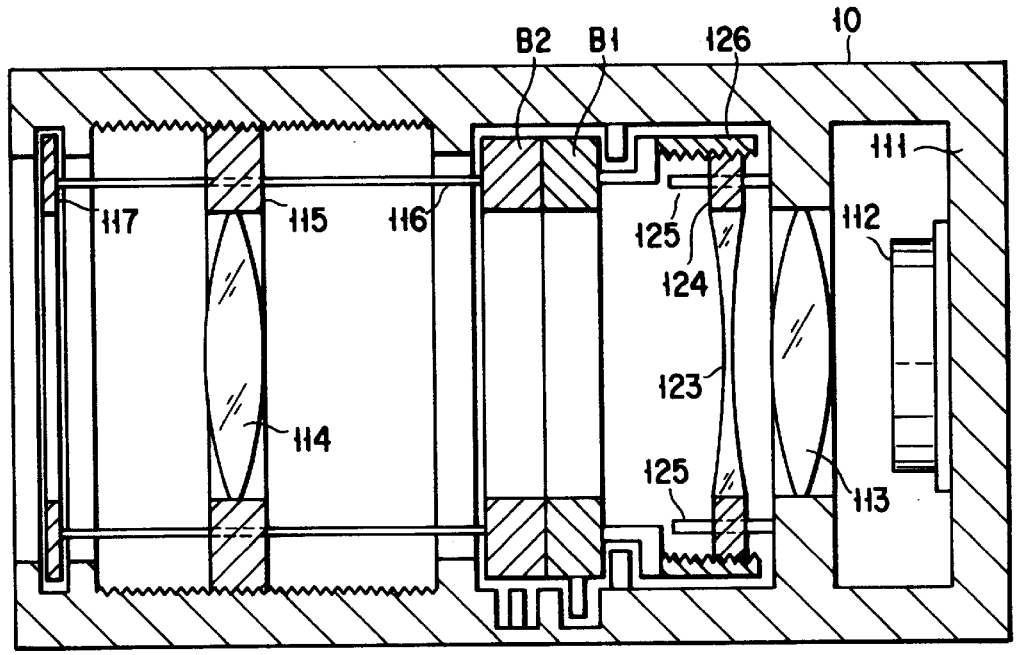
F I G. 7
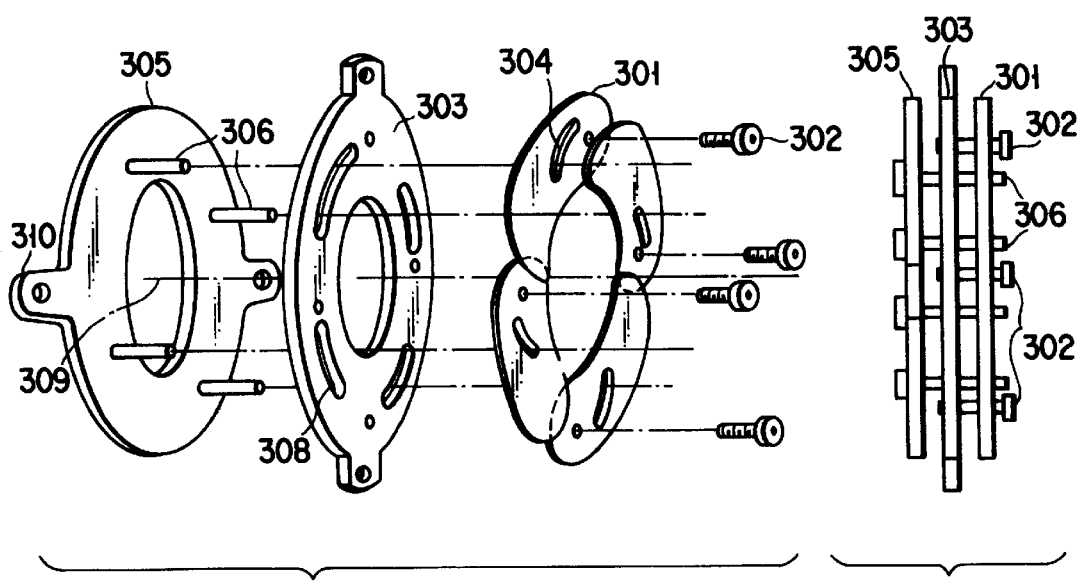
F I G. 8A          F I G. 8B

RELEASED STATE

STOPPED-OUT STATE

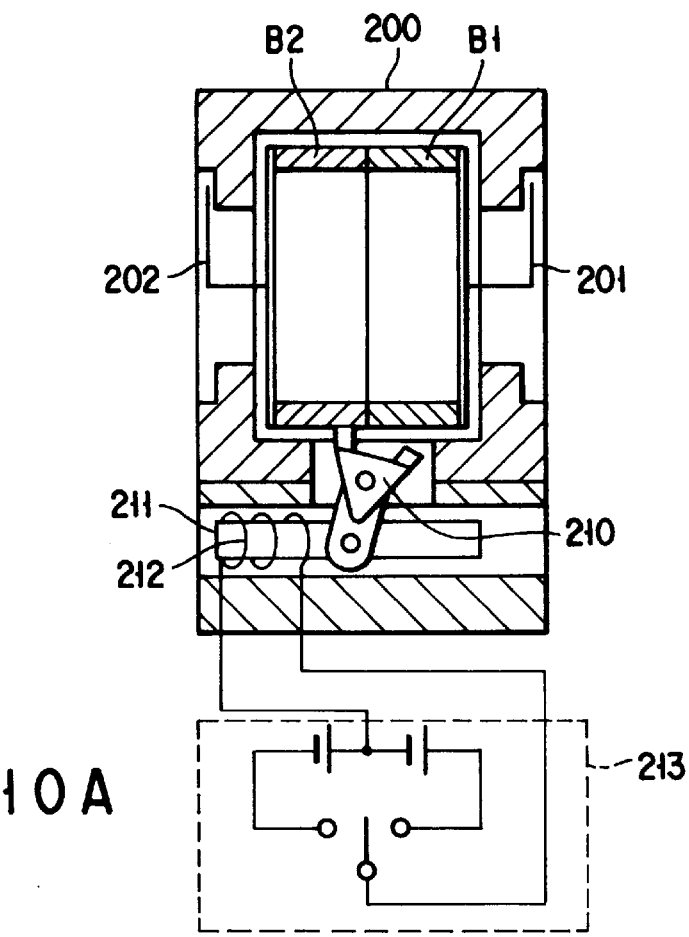
F I G. 10A
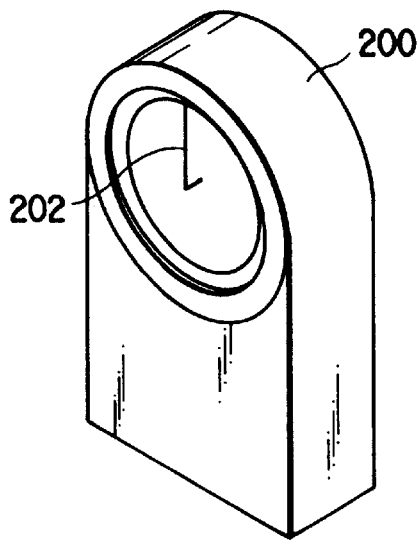
F I G. 10B
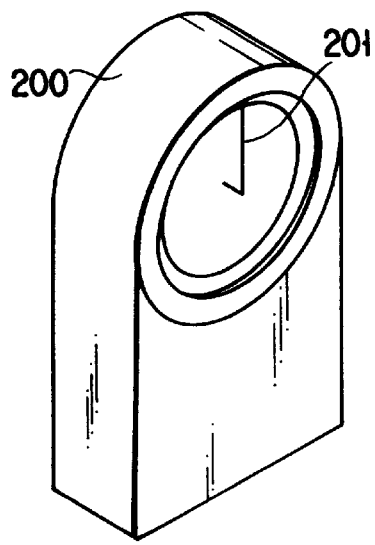
F I G. 10C

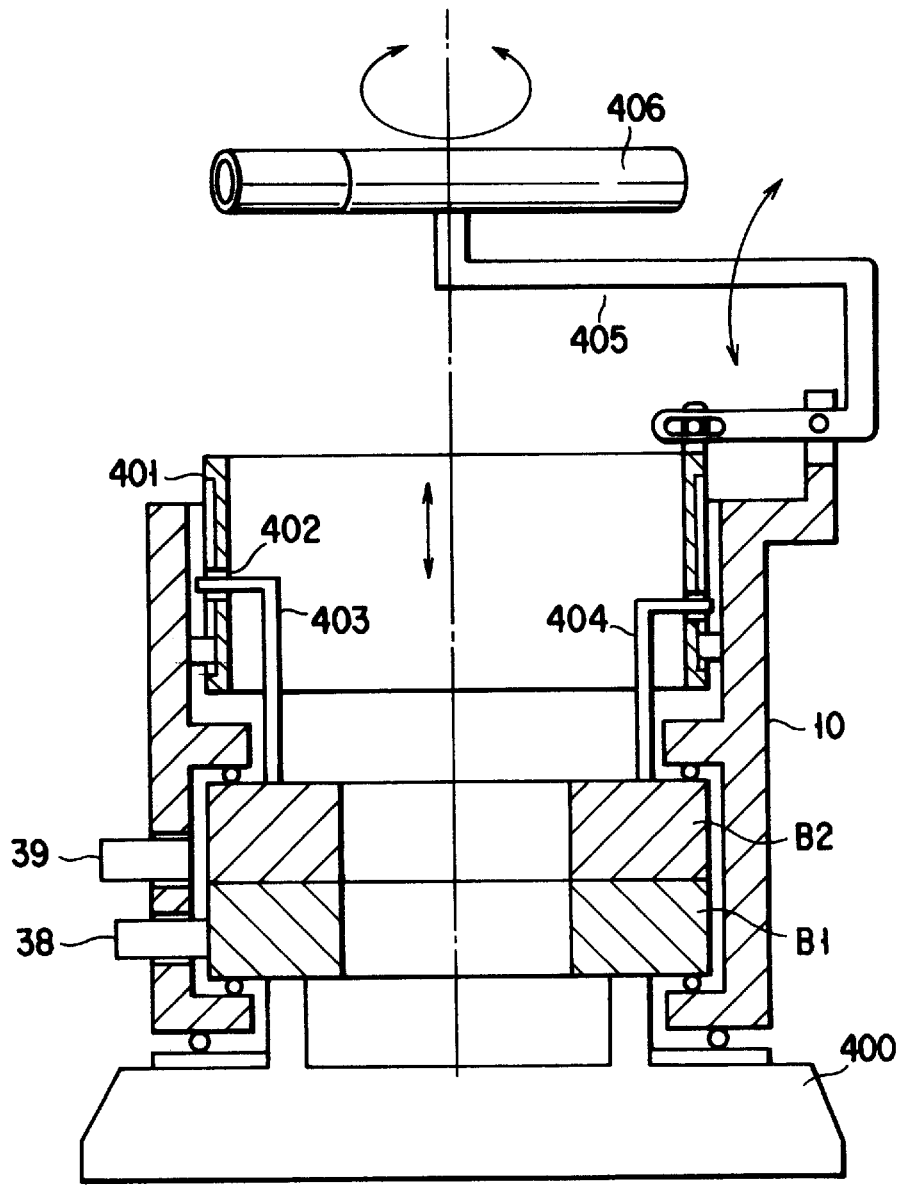
F I G. 11A
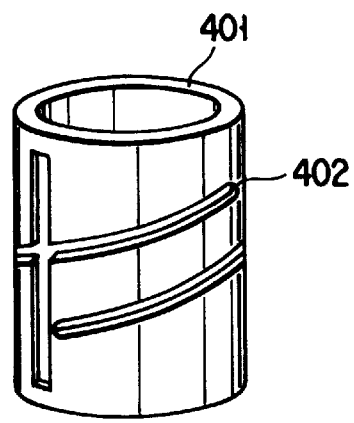
F I G. 11B

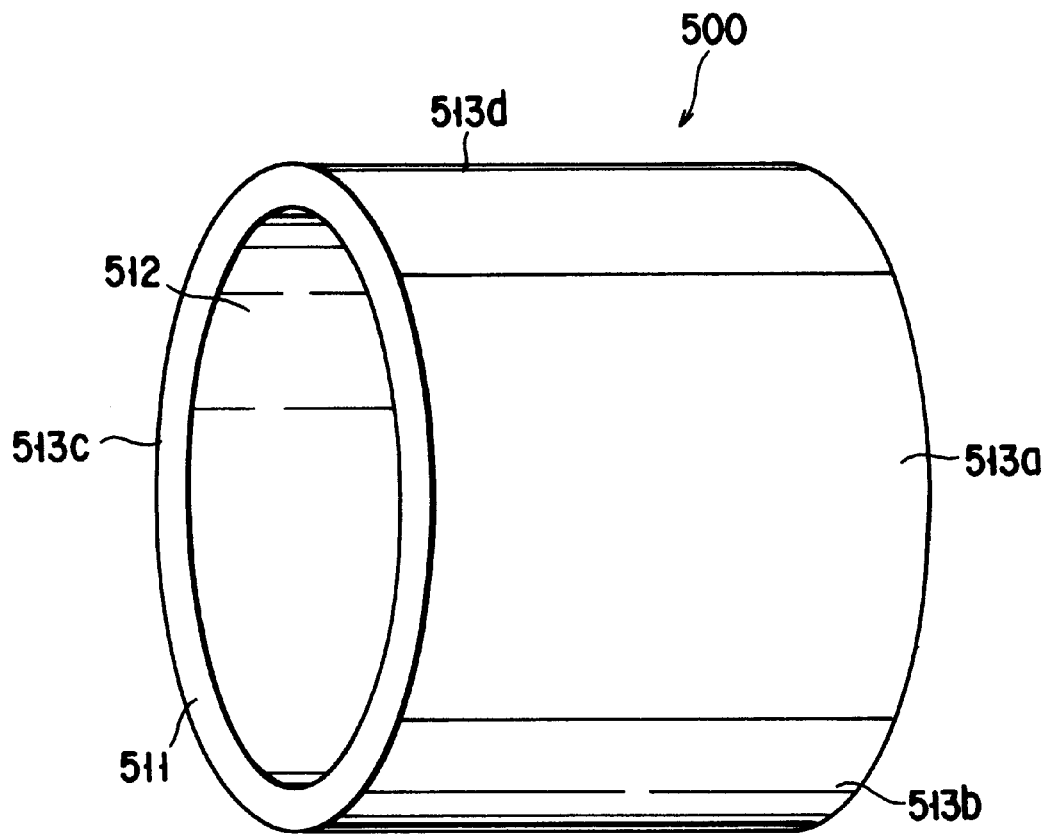
F I G. 12A
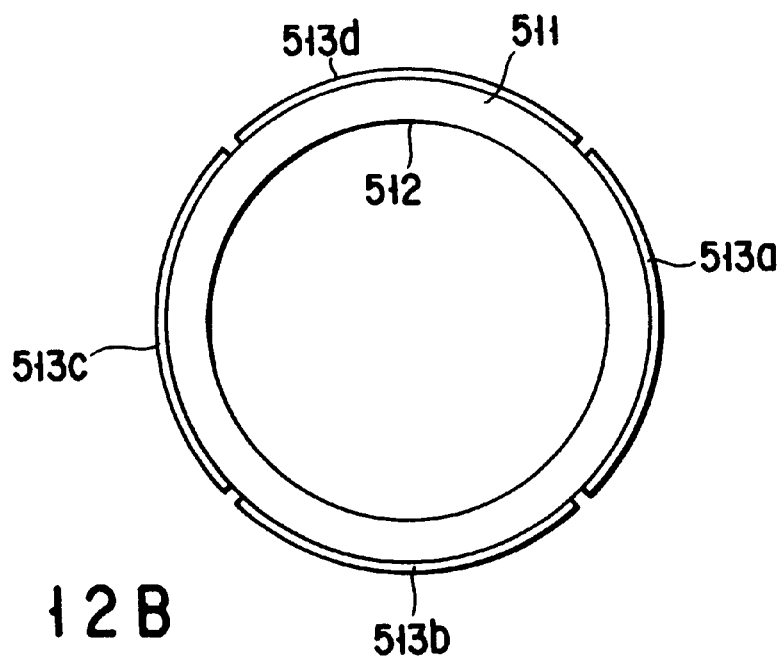
F I G. 12B

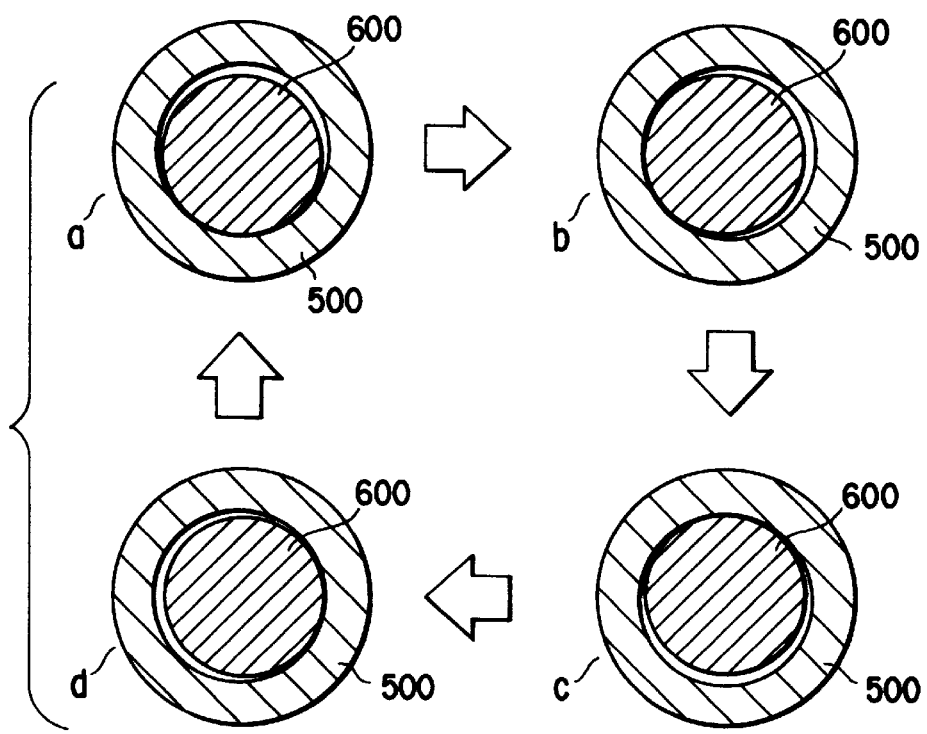
A FIRST OSCILLATION MODE
F I G. 13
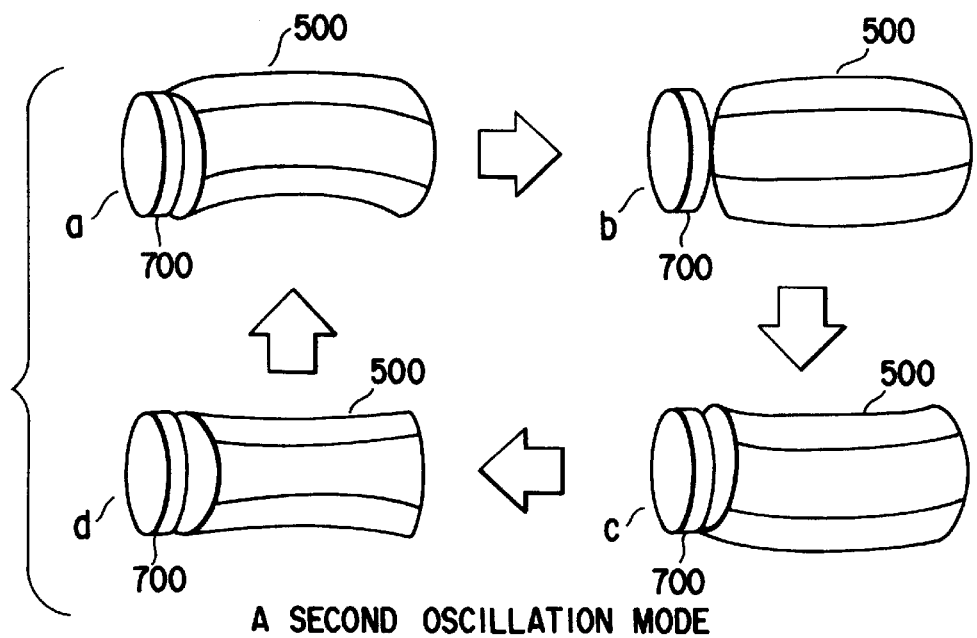
A SECOND OSCILLATION MODE
F I G. 14

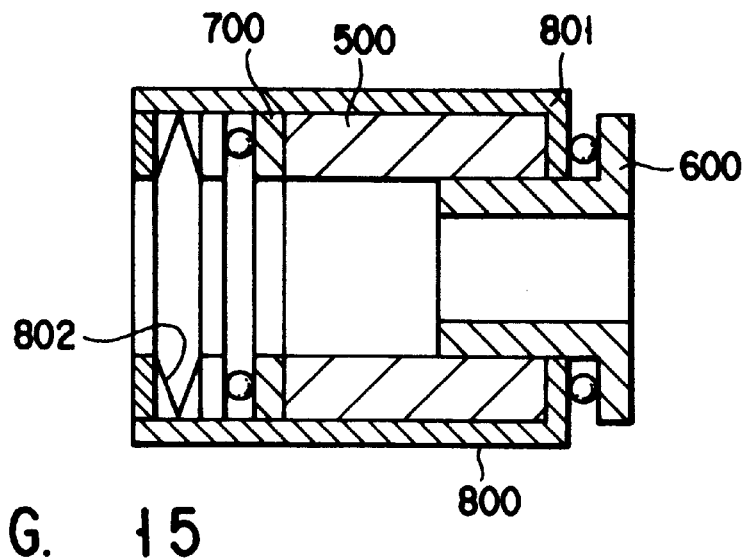
F I G. 15
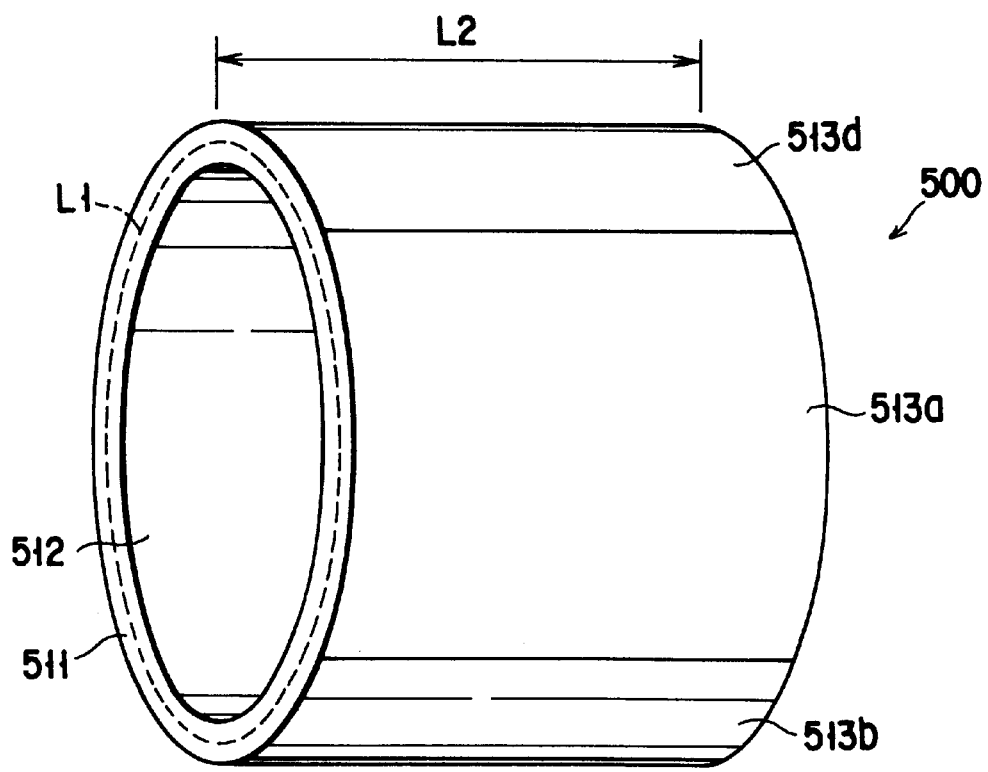
F I G. 16

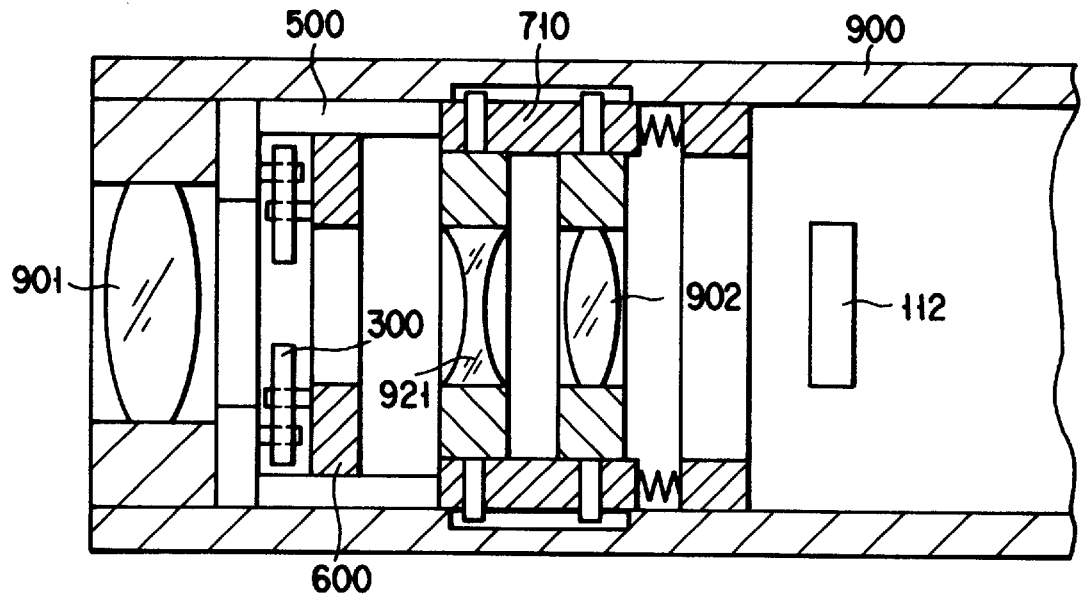
F I G. 20
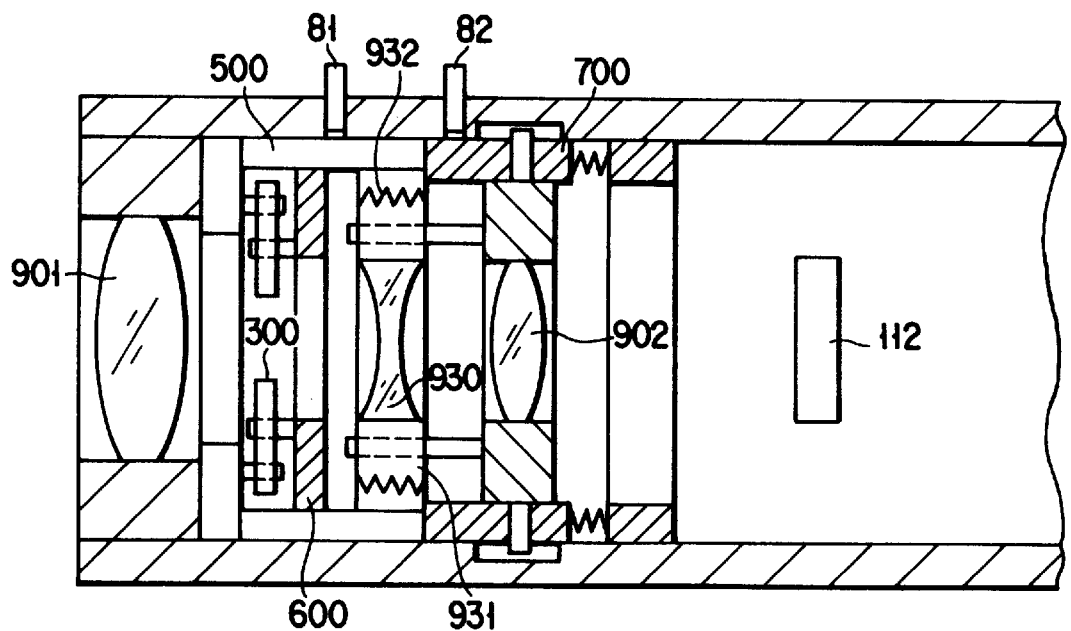
F I G. 21

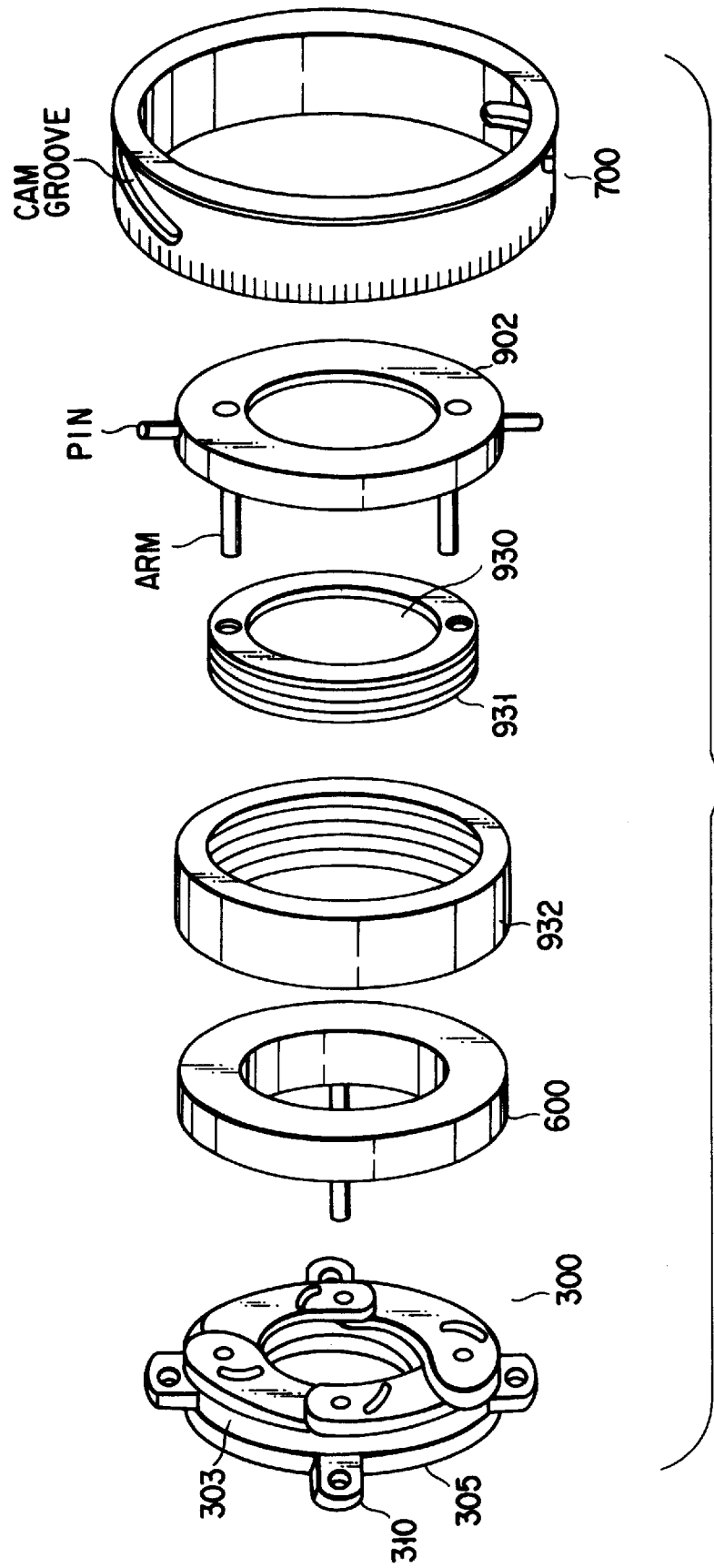

MULTI-FUNCTIONAL ULTRASONIC MOTOR AND APPARATUS USING THE SAME

BACKGROUND OF THE INVENTION

1. Field of the Invention

The present invention relates to a multi-functional ultrasonic motor and an apparatus using this motor.

2. Description of Related Art

Traditionally, a plurality of motors have so been used to drive control objects many. In the case of drive-controlling at least two objects individually by one motor, a power transmission mechanism and a power switching mechanism is not so complex. However, in the case of drive-controlling three or more objects, the power transmission mechanism and the power switching mechanism to be used for this work become extremely complex and the overall size of the apparatus becomes large. Because there is a limit to the reduction in the size of the conventional motor and its peripheral structure, there is also a limit to the reduction in the overall size of the apparatus for mounting the motor.

A focus is now being placed on an ultrasonic motor as a motor which can have a small size. An ultrasonic motor that utilizes an oscillation of 20 kHz or above, can obtain a high torque even during a low-speed rotation and requires no gears for deceleration. The result is a quiete rotation and a simple structure. Further, since the ultrasonic motor does not require a member as a rotation axis, the motor is able to have a stator and a rotor formed in a cylinder shape respectively.

SUMMARY OF THE INVENTION

It is the objective of the present invention to provide a multi-functional ultrasonic motor which can drive-control a plurality of objects. The motor is further designed to have multi-functions and have an apparatus.

It is another object of the present invention to provide a multi-functional ultrasonic motor which can selectively drive-control a number of objects and an apparatus.

In order to achieve the objectives described above, the present invention includes a first rotating unit which functions as a rotor or stator, a second rotating unit which functions as a stator or a rotor, a pressing unit for setting the rotation planes of the first and second rotors in a state of being pressed with each other with the rotation planes faced with each other, a current feeding unit for supplying a current to a piezoelectric element provided on any one or both of the rotation planes of the first and second rotating units, and a stopping unit for selectively stopping any one of the rotations of the first and second rotating units.

With the above-described structure, it becomes possible to link the first and second rotating units to the respective objects to be controlled, to thereby exhibit a plurality of functions of the conventional motors.

Further, in order to achieve the above-described objects of the present invention, the present invention also includes at least an ultrasonic oscillator having a cylinder-shaped piezoelectric element, a total-plane electrode provided on any one of the inner periphery and the outer periphery of the piezoelectric element and a split electrode provided on the other periphery, a first rotor to be driven in a first oscillation mode generated on the inner periphery and the outer periphery of the ultrasonic oscillator, and a second rotor to be driven in a second oscillation mode generated on the end surface of the ultrasonic oscillator.

Assume that the resonance frequencies of the first oscillation mode to be determined by a length L1 of a circumferential direction of the ultrasonic oscillator are expressed as f10, f11, f12, . . . , and the resonance frequencies of the second oscillation mode to be determined by a length L2 in a direction orthogonal with the circumference of the ultrasonic oscillator are expressed as f20, f21, f22, . . . . In this case, when L1 and L2 are determined in such a way that f1n which is one of the resonance frequencies of the first oscillation mode to be used at the time of driving the ultrasonic motor does not interfere with any one of the resonance frequencies of the second oscillation mode and f2n which is one of the resonance frequencies of the second oscillation mode to be used at the time of driving the ultrasonic motor does not interfere with any one of the resonance frequencies of the first oscillation mode, or when f1n and f2n which have been determined this way are used, it becomes possible to take out two independent torques from the one ultrasonic oscillator and drive the separate rotors.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWING

FIGS. 2A, 2B and 2C are explanatory diagrams of a first rotating unit of FIG. 1.

FIG. 5 is a diagram for showing still another embodiment of the present invention.

FIG. 6 is a diagram for showing still another embodiment of the present invention.

FIG. 7 is a diagram for showing still another embodiment of the present invention.

FIGS. 8A and 8B are diagrams for showing the structure of an iris mechanism.

FIGS. 10A, 10B and 10C are diagrams for showing still another embodiment of the present invention.

FIGS. 11A and 11B are diagrams for showing still another embodiment of the present invention.

FIGS. 12A and 12B are diagrams for showing a ultrasonic oscillator relating to the present invention.

FIG. 13 is a diagram for explaining the operation of a first oscillation mode of the ultrasonic oscillator.

FIG. 14 is a diagram for explaining the operation of a second oscillation mode of the ultrasonic oscillator.

FIG. 15 is a diagram for showing still another embodiment of the present invention.

FIG. 16 is a diagram for explaining the relationship between the design length of the ultrasonic oscillator and the oscillation.

FIG. 20 is a diagram for explaining the structure of still another video camera using the present invention.

FIG. 21 is a diagram for explaining the structure of still another video camera using the present invention.

FIG. 22 is a diagram for explaining an example of the internal parts of the camera shown in FIG. 21.

DETAILED DESCRIPTION OF THE INVENTION

Embodiments of the present invention will be explained below with reference to the drawings.

Figure 1A:
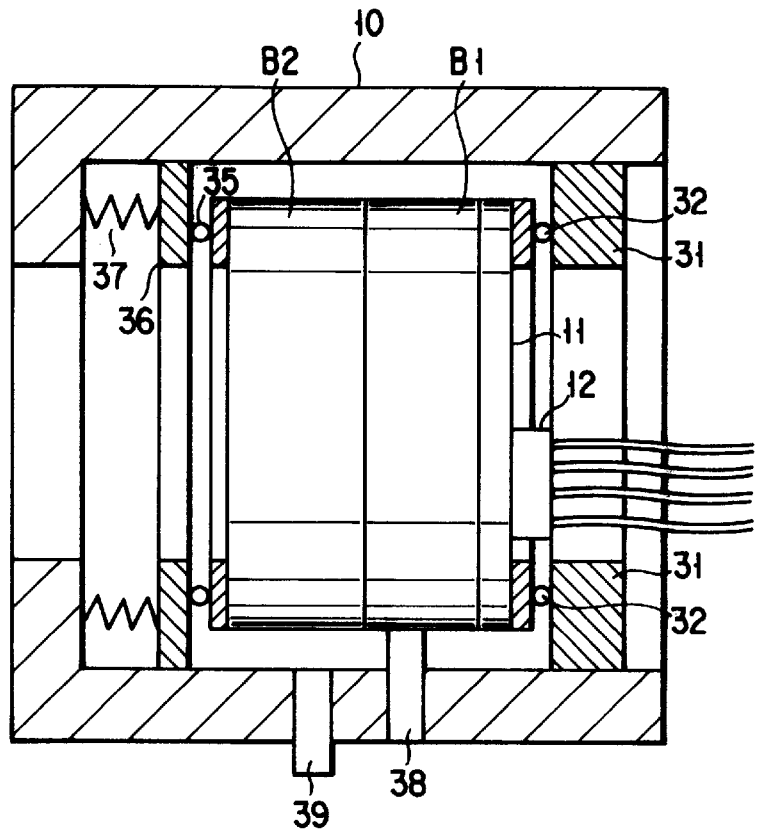
FIGS. 1A and 1B are diagrams for showing the basic structure of a first embodiment of the present invention.
Figure 1B:
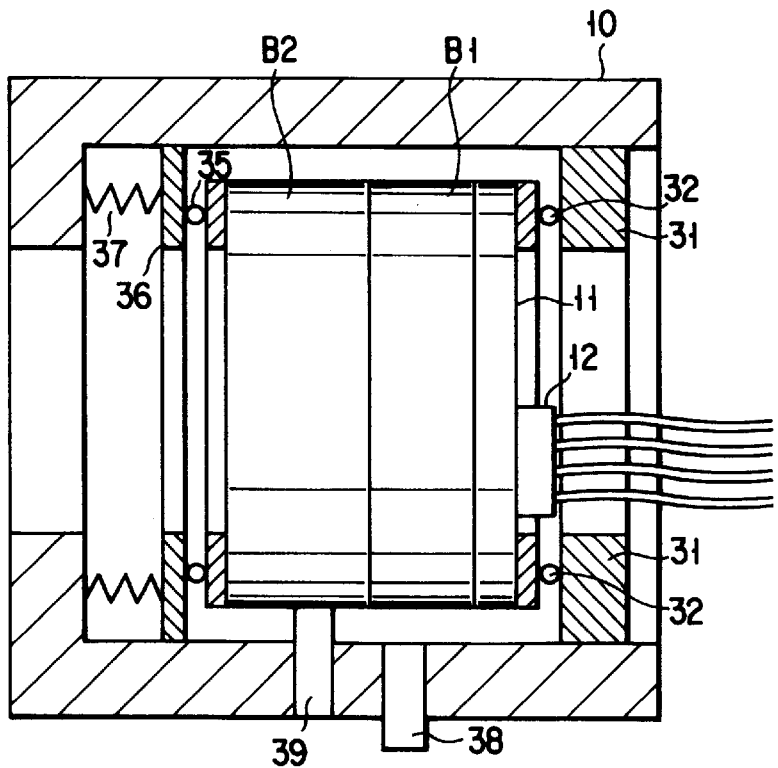

FIGS. 1A and 1B show the basic structure of the present invention. A casing 10 is formed in a cylinder. The first and second rotating units B1 and B2 are coaxially and rotatably disposed inside the casing 10.

FIG. 2A shows the first rotating unit B1. The first rotating unit B1 has a ring-shaped piezoelectric element B0. The electrodes b11, b12, b13 and b14 are mounted around the outer periphery of the piezoelectric element B0 in four equally divided parts. The electrodes b21, b22, b23 and b24 mounted around the inner periphery of the piezoelectric element B0 in four equally divided parts. The electrodes b11 and b22, the electrodes b12 and b23, the electrodes b13 and b24 and the electrodes b14 and b21 are positioned diagonally across each other and are connected to each other by lines L1, L2, L3 and L4 respectively. The piezoelectric element B0 has a groove formed between the adjacent electrodes of the outer periphery and also has a groove formed between the adjacent electrodes of the inner periphery. A basic structure of a motor which uses a piezoelectric element is shown in JPN, PAT, appln, (KOKAI) publication NO. 3-303572.

At the side of the connection lines L1, L2, L3 and L4 of the piezoelectric element B0, a terminal plate 11 having ring terminals P1, P2, P3 and P4 (reference FIG. 2B) formed in a cap-shaped insulation material (reference FIG. 2C) and electrically contacted with the connection lines L1, L2, L3 and L4, is fitted. A brush terminal 12 is contacted to each of the ring terminals P1, P2, P3 and P4 of the terminal plate 11 so that the terminal is electrically guided. According to this ultrasonic motor, when a voltage is supplied to one set of electrodes, with the rest of the electrodes earthed, and a voltage is supplied to the next adjacent set of electrodes, with the rest of the electrodes earthed, the motor sequentially changes over this state in the rotating direction. It becomes possible to generate a rotation oscillation to cause unit B1 or B2 to rotate.

Description will be made with reference to FIGS. 1A–1B.

The outer peripheral section of the outside rotation plane of the first rotating unit B1 is held within the casing 11 by a stopper 31 through bearings 32. It is possible to transmit a driving signal to the piezoelectric element through the brush terminal 12. The other rotation plane of the first rotating unit B1 is brought into contact with one rotation plane of the second rotating unit B2. The outer periphery of the other rotation plane of the second rotating unit B2 is being pressed in a direction parallel with the axis by a ring-shaped rotatable pressing member 36 through bearings 35. This pressing member 36 is being pressed in a direction parallel with the axis by a spring 37 as an elastic member.

In this case, a stopping mechanism is provided between the first and second rotating units B1 and B2 and the casing 10. The stopping mechanism selectively stops any one of the rotating units. More specifically, pressing members 38 and 39 are brought into contact with the peripheral planes of the rotating units B1 and B2 from the side of the casing 10.

According to FIG. 1A, the pressing member 38 presses the rotating unit B1 to make the rotating unit B1 function as a stator and the rotating unit B2 function as a rotor. When a driving signal is applied in this state to the piezoelectric element located in the rotating unit B1, an oscillation wave having a rotation directivity is transmitted to the rotating unit B2 through the rotating unit B1. As a result the rotating unit B2 starts to rotate.

On the other hand, according to FIG. 1B, the pressing member 39 is pressing the rotating unit B2 to make the rotating unit B2 function as a stator and the rotating unit B1 function as a rotor. Since a current is being supplied to the piezoelectric element of the rotating unit B1 through the brush mechanism, the rotating unit B1 can function as a rotor and the rotating unit B2 can function as a stator.

FIGS. 3A, 3B and FIGS. 4A, 4B are diagrams for explaining other embodiments of the present invention. These embodiments are different from the first embodiment in the structure of the first rotating unit B1, and more specifically, the shape of the piezoelectric element.

The casing 10 is in a cylinder shape. The first and second rotating units B1 and B2 are coaxially and rotatably disposed inside the casing 10. An earth electrode 21 is provided on the outside rotation plane of the first rotating unit B1, a ring-shaped piezoelectric element 22 is provided on the earth electrode 21, and the piezoelectric element 22 is provided with a plane electrode 23 for supplying a driving signal to the piezoelectric element 22.

The outer peripheral section of the outside rotation plane of the first rotating unit B1 is held within the casing 10 by the stopper 31 through the bearings 32. Further, a brush mechanism 33 is provided between the outer periphery of the first rotating unit B1 and the casing 10, and an outside terminal 34 of the casing is connected through the brush mechanism 33 for supplying a driving signal to the piezoelectric element 22.

The other rotation plane of the first rotating unit B1 is brought into contact with one rotation plane of the second rotating unit B2. The ring-shaped rotatable pressing members 36 through the bearings 35 presses the outer periphery of the other rotation plane of the second rotation unit B2 in a direction parallel with the axis The pressing member 36 is being pressed in a direction parallel with the axis by the spring 37 as an elastic member.

In this case, a stopping mechanism is located between the first and second rotating units B1 and B2 and the casing 10, for selectively stopping any one of the rotating units. More specifically, the pressing members 38 and 39 are provided which are brought into contact with the peripheral planes of the rotating units B1 and B2 from the side of the casing 10.

Figure 3A:
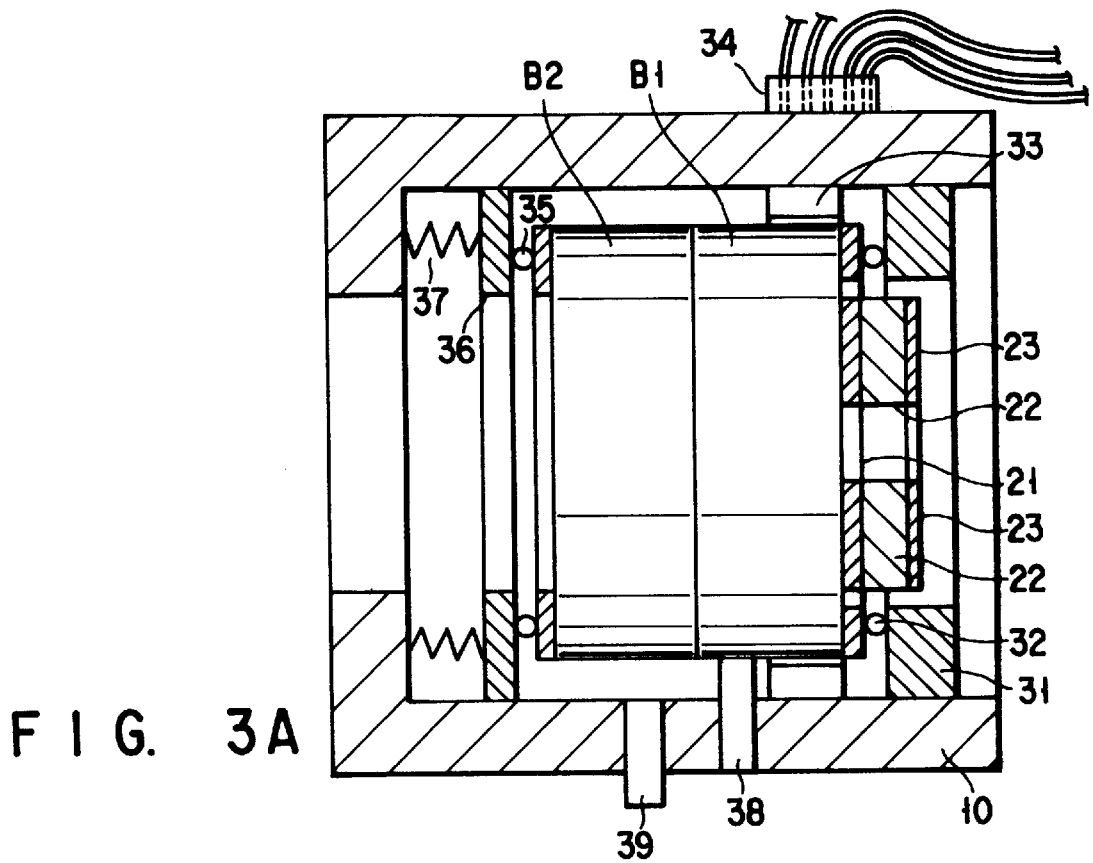
FIGS. 3A and 3B are diagrams for showing the basic structure of another embodiment of the present invention.
Figure 3B:
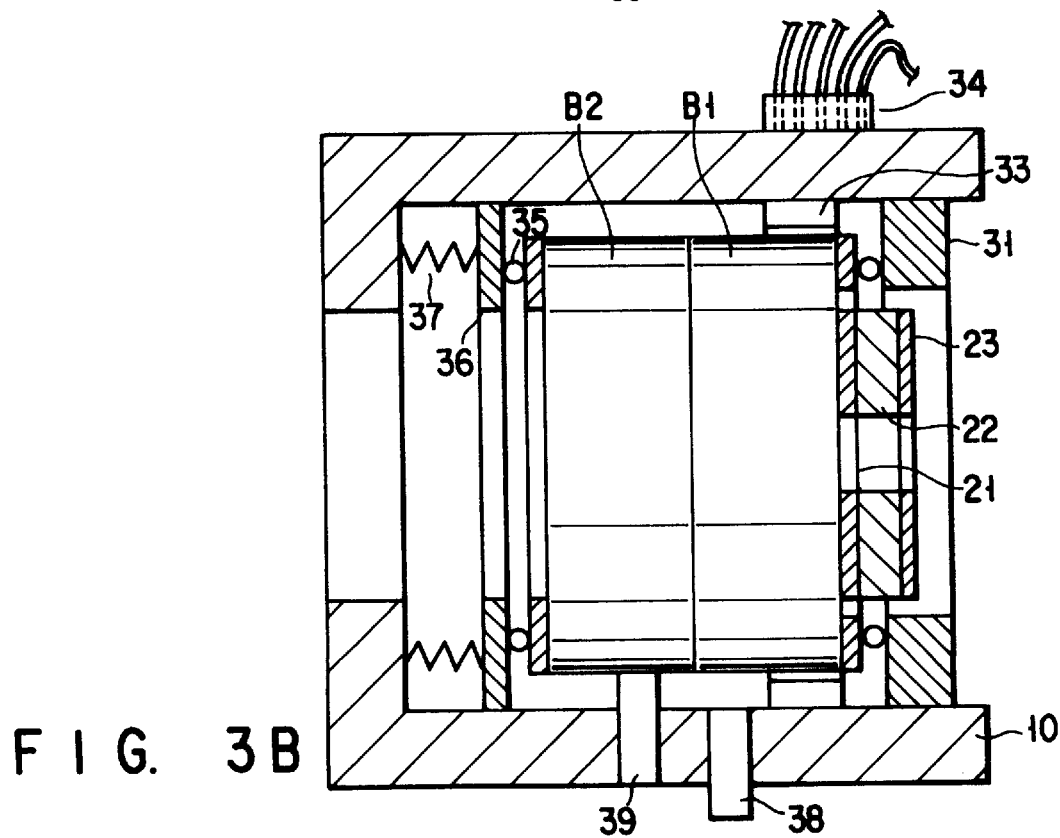

According to the state of FIG. 3A, the pressing member 38 presses the rotating unit B1 to make the rotating unit B1 function as a stator and the rotating unit B2 function as a rotor. When a driving signal is applied in this state to the piezoelectric element 22 located in the rotating unit B1, an oscillation wave having a rotation directivity is transmitted to the rotating unit B2 through the rotating unit B1 so that the rotating unit B2 starts rotation. On the other hand, according to the state of FIG. 3B, the pressing member 39 presses the rotating unit B2 to make the rotating unit B2 function as a stator and the rotating unit B1 function as a rotor. Since a current is being supplied to the piezoelectric element 22 of the rotating unit B1 through the brush mechanism 33, the rotating unit B1 can function as a rotor and the rotating unit B2 can function as a stator.

Figure 4A:
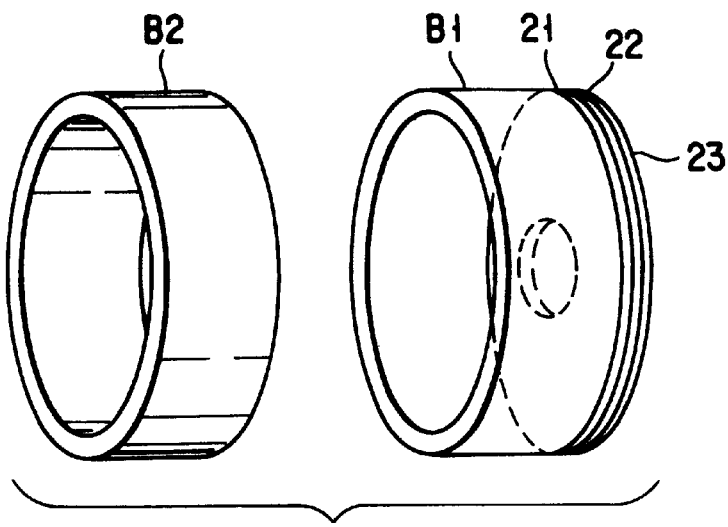
FIGS. 4A and 4B are diagrams for explaining the principle of the ultrasonic motor of FIG. 3A.
Figure 4B:
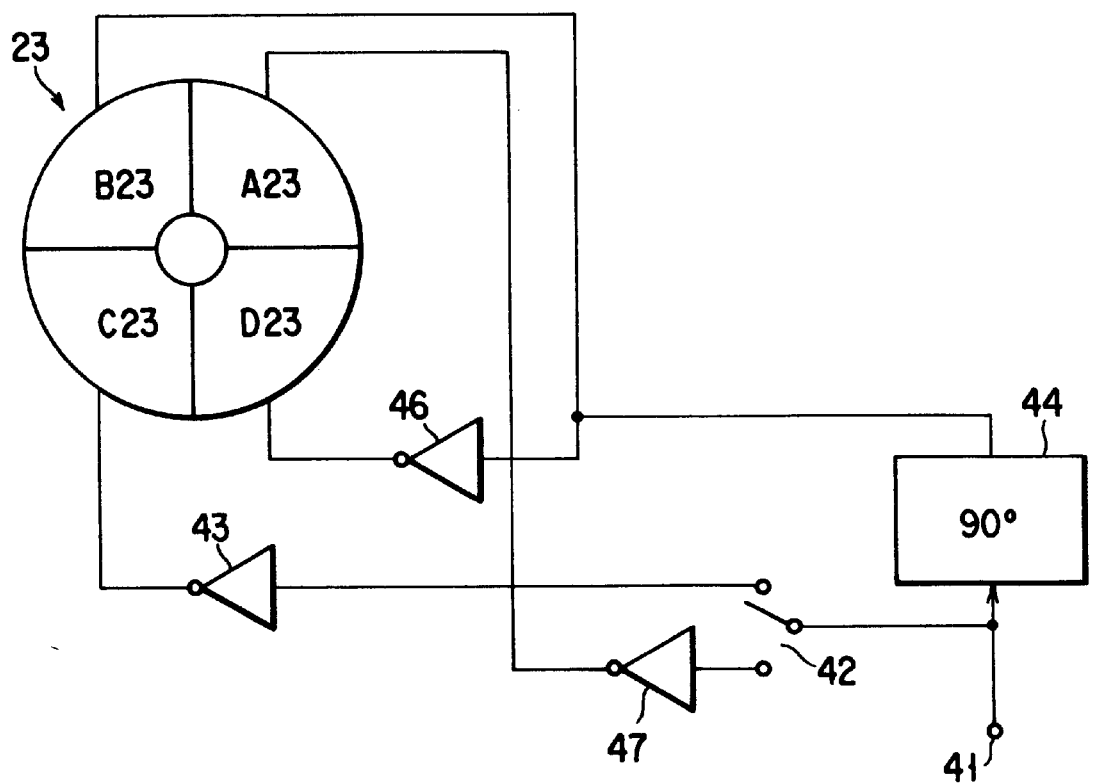

FIG. 4A shows a perspective view of the first and second rotating units B1 and B2. FIG. 4B shows a diagram for applying a driving voltage to the piezoelectric element 22. Suppose the respective electrodes of the ring-shaped piezoelectric element are expressed as A23, B23, C23 and D23, the electrodes A23 and C23 which are disposed to face each other with the axis therebetween are supplied with phase inverted driving signals. Also, the electrodes B23 and D23 which are disposed to face each other with the axis therebetween are supplied with phase inverted driving signals. Further, the adjacent driving signals are 90°.

The relationship between the electrodes in FIG. 4B and the electrodes in FIG. 2A is as follows. The electrode A23 corresponds to the electrodes b11 and b22, B23 to b12 and b23, C23 to b13 and b24, and D23 to b14 and b21.

For this purpose, inverters 43 and 46 are used. An AC signal to be applied to an input terminal 41 is supplied to the electrode C23 through the inverter 43 as well as to the electrode A23 through a switch 42. Further, an AC signal of the input terminal 41 is supplied to the electrode B23 through a 90° phase shifter 44 as well as being supplied to the electrode D23 through the inverter 46. When a rotation direction is to be changed over, the switch 42 is changed over to an inverter 47 side.

FIG. 5 shows an embodiment of a video camera which uses the present invention.

A casing 10 is formed in a cylinder having a bottom. An image pick-up device 112 is coaxially fitted to the inside of a bottom section 111. In front of the image pick-up device 112, a lens 113 is coaxially disposed as an after lens, an iris mechanism 300 is coaxially disposed in front of the lens 113, and first and second rotating units B1 and B2 are coaxially disposed to coaxially structure a motor section in front of the iris mechanism 300.

Further, in front of this motor section, a focusing lens 114 is disposed. The focusing lens 114 is being held by a holding ring 115. The outer periphery of the holding ring 115 is meshed with a screw groove formed inside the casing 10. Accordingly, when the holding ring 115 is rotated, the focusing lens 114 can be moved in the axial direction of the casing 11 (forward and backward directions).

In this case, the first rotating unit B1 of the motor is engaged with a driving projection of the iris mechanism 300. Thus making it possible to adjust the iris state of the iris mechanism 300. The second rotating unit B2 has a shaft 116 projected in a direction parallel with the axis, to pierce through the surrounding section of the holding ring 115 in an axial direction. As a result, the second rotating unit B2 rotatably drives the holding ring 115. The front end of the shaft 116 is fitted to a rotatable positioning ring 117. With this structure, the motor section can selectively drive the iris mechanism 300 and the focusing lens 114.

FIG. 6 shows still another embodiment of the application of the present invention.

This embodiment is also an example of the present invention being applied to a video camera. Those portions which are common to those in the preceding embodiment are attached with the same reference numerals. According to this embodiment, a zoom lens 121 is provided at the portion where the focusing lens 114 is provided in the preceding embodiment, and a focusing lens 122 is provided at the front end portion of the casing 11. With this structure, the motor section can selectively drive the iris mechanism 300 and the zoom lens 121. In this case, it is possible for the lens 113 to move the forward and backward direction by manual operation.

FIG. 7 shows still another embodiment of the application of the present invention.

This embodiment is also an example of the present invention being applied to a video camera. Those portions which are common to those in the preceding embodiment are attached with the same reference numerals. According to this embodiment, a zoom lens 123 is disposed at the position where the iris mechanism 300 is located in the embodiment shown in FIG. 5. A frame 124 of the zoom lens 123 is supported by an axis 125 so as to be movable in a light axis direction. The outer periphery of the frame 124 is meshed with a screw groove provided on the inner periphery of a casing 126 that rotates interlocked with the first rotating unit B1 of the motor section. With this structure, the zoom lens 123 can be driven in the forward and backward directions along with the rotation of the first rotating unit B1.

Figure 9A:
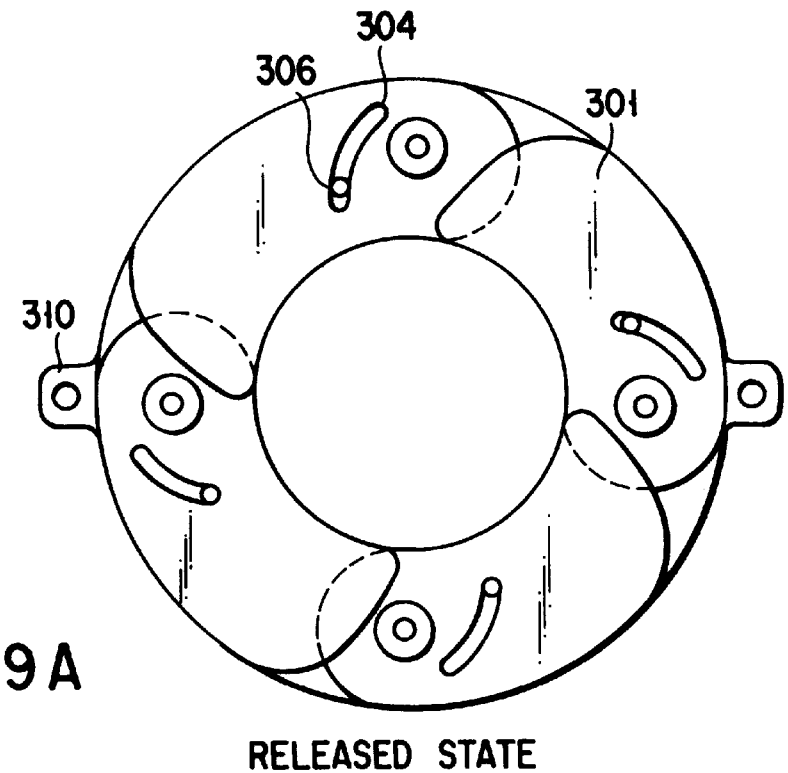
FIGS. 9A and 9B are diagrams for explaining the operation of the iris mechanism.
Figure 9B:
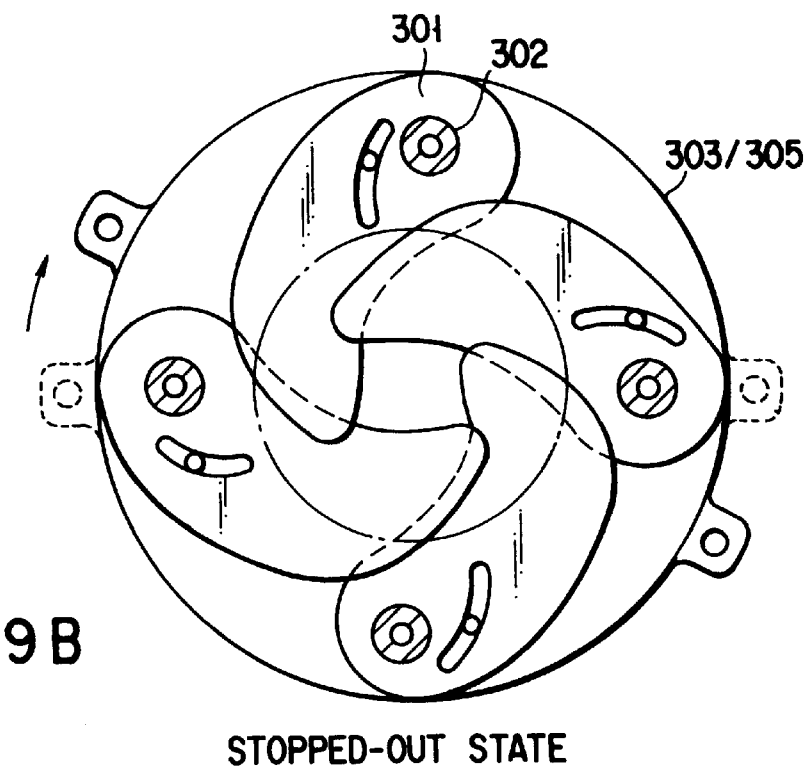

FIG. 8A shows a broken-down perspective view of the iris mechanism, and FIG. 8B shows a cross-sectional view. FIGS. 9A and 9B show a state that the iris mechanism is released and a state that the iris mechanism has been fully stopped down respectively.

The above-described iris mechanism is the iris mechanism having four feathers; basically, iris feathers 301 are movably fitted to a base 303 by axial pins 302. The iris feathers 301 are structured by thin steel sheets or resin sheets. A guide hole 304 is formed in each of the iris feathers 301. Guide pins 306 provided on a rotating plate 305 are inserted into the guide holes 304 after piercing through long holes 308 of the base 303. The rotating plate 305 can rotate with a light path 309 used as an axial core. According to the usual optical system, a projection 310 is return moved by a solenoid, a galvanometer or the like to rotate the rotating plate 305 to drive the iris feathers 301.

The guide pins 306 which rotate around the light path make the respective iris feathers 301 rotate around the axial pins 302 by pushing the guide holes 304 located on the iris feathers 301. FIG. 9A shows a state that the iris is opened. Since each of the guide holes 304 has a slope in a radiation direction with respect to the light path, when the guide pins 306 move by rotation together with the rotating plate 305, the guide pins 306 can rotate around the axial pins of the iris feathers 301 with the guide holes 304 working as cam grooves. With this operation, it becomes possible to make the iris in a released state and a closed state as shown in FIGS. 9A and 9B respectively. As a result, the area of the light path is adjusted to obtain an adjustment of the light quantity. The iris mechanism is not limited to the above-described structure but can have various types of structure.

FIGS. 10A, 10B and 10C show still another embodiment of the present invention.

This embodiment shows an example of the application of the present invention to a two-plane display clock. Referring to FIG. 10A, a clock case 200 coaxially accommodates first and second rotating units B1 and B2 in its cylindrical hollow section. Clock hands 201 and 202 are stretched out from the outside rotating planes of the first and second rotating units B1 and B2 respectively. The clock hands 201 and 202 have L shape and their front ends are positioned at a clock display section shown around a circular window provided on the clock case 200.

At one section of the outer periphery of the clock case 200, a stopping member 210 for alternately stopping the first and second rotating units B1 and B2 is provided. This stopping member 210 is connected to an iron core 211, and this iron core 211 makes a return move by an electromagnetism generated in a coil 212. When the iron core 211 makes a return movement, the stopping member 210 is alternately brought into contact with the outer periphery of the rotating units B1 and B2, with one of the rotating units kept stopped and the other rotated, to thereby make the clock tick. The coil 212 is being supplied with a driving signal from a driving circuit 213 so that a current flows alternately.

FIGS. 10B and 10C show perspective views of the two-side display clock as observed from the clock hands 202 and 201 sides respectively.

A mechanism for making one of the rotating units rotate while keeping the other stationary is not limited to the above-described example but this can be provided by other various forms. A rotating unit having a piezoelectric element may be at the second rotating unit side. Although the pressing unit for bringing the rotation planes of the first and second rotating units into contact with each other and the stopping unit for stopping the rotation of any one of the rotating units are omitted in the embodiments shown in FIGS. 5, 6, 7 and 10, it is possible that these embodiments take the structure similar to that shown in FIG. 3 or any other forms.

FIGS. 11A and 11B show still another embodiment of the application of the present invention. Those portions which are common to those in the preceding embodiments are attached with the same reference numerals.

According to this embodiment, one end portion in the axial direction of the first rotating unit B1 is fixed on a base 400. The upper side portion of the casing 10 is coaxially and able to slide the axial direction provided with a driving cylinder 401 (reference FIG. 11B). The driving cylinder 401 is formed with a spiral groove 402. The front ends of driving axes 403 and 404 that rotate integrally with the second rotating unit B2 are engaged with the spiral groove 402. When the first rotating unit B1 is fixed by a pressing member 38, the second rotating unit B2 is rotated, so that the driving axes 403 and 404 is rotated and the driving cylinder 401 moves in the axial direction. This move is transmitted to a vide camera body 406 through a lever 405 so that the elevation angle of the video camera 406 can be changed.

Next, when the pressing member 39 releases the first rotating unit B1 and restricts the rotation of the second rotating unit B2, the whole apparatus can be rotated around the axis. This makes it possible to change the direction of the video camera 406.

As explained above, according to the present invention, it is possible to provide multi-functions to the motor so that a plurality of objects to be controlled can be driven. Accordingly, it becomes possible to make the whole apparatus in a compact structure at low cost.

The above-described rotating unit B1 is utilized as an ultrasonic oscillator which oscillates always in the same oscillation mode. However, the ultrasonic oscillator can also be driven in a plurality of oscillation modes. It is thus possible to drive different rotating units in different oscillation modes. The ultrasonic oscillator which is driven in a plurality of oscillation modes will be explained below.

FIGS. 12A and 12B are outer views for showing one example of an ultrasonic oscillator 500 to be used in the present invention. This ultrasonic oscillator 500 can be used as the rotating unit B1.

A total-plane electrode 512 is provided on the inner surface of a cylindrical piezoelectric element 511, and split electrodes 513a, 513b, 513c and 513d divided into four are located in the circumferential direction on the outer peripheral surface. AC voltages of high frequency are applied between the split electrodes 513a, 513b, 513c and 513d and the total-plane electrode 512 respectively. The AC voltages applied between the adjacent split electrodes have their phases shifted by 90° respectively. Thus the ultrasonic oscillator 500 is excited by a first oscillation mode or a second oscillation mode.

FIG. 13 is a diagram for explaining the principle of the first oscillation mode.

Of the four areas of the piezoelectric element 511 divided by the four split electrodes 513a, 513b, 513c and 513d, the piezoelectric element is compressed in a radius direction in one or two areas, and the piezoelectric element is extended in a radius direction in the areas facing these areas. These compressed and extended areas sequentially move to the adjacent areas to have the states of a, b, c and d shown in FIG. 13. Therefore, a rotor 600 can rotate by friction within a hollow in contact with the inner peripheral surface.

FIG. 14 is a diagram for explaining the principle of the second oscillation mode.

A rotor 700 (this rotor can function as the rotating unit B2 in FIG. 1) is provided so that the periphery of the rotation plane of the rotor 700 is brought into contact with the end plane in the axial direction of the piezoelectric element 511. In this case, of the four areas of the piezoelectric element 511 divided by the four split electrodes 513a, 513b, 513c and 513d, the piezoelectric element is compressed in a radius direction in one or two areas so that the piezoelectric element is extended in a direction orthogonal with the circumference in these areas, and the piezoelectric element is extended in a radius direction in the areas facing the above one or two areas so that the piezoelectric element is compressed in a direction orthogonal with the circumference in these areas. In other words, the states of a, b, c and d shown in FIG. 14 are taken. As a result, the ultrasonic oscillator 500 and the rotor 700 are brought into contact with each other only at a portion extended in a direction orthogonal with the circumference of the ultrasonic oscillator and this portion moves sequentially to the adjacent portion, so that the rotor 700 is rotated by the friction.

FIG. 15 is a cross-sectional view for showing one example of a two-functional motor for driving a rotor 500 and rotors 600 and 700 by a first oscillation mode and a second oscillation mode. The cylindrical ultrasonic oscillator 500 is inserted into a hollow of an external case 800, with its one end stopped by a stopper 801 which is formed by being folded at an end of the external case 800 and the other end being pressed with the end plane of the rotor 700 by the force of a spring 802. The rotor 600 is inserted into the inner peripheral plane of the ultrasonic oscillator 500 to keep contact with this plane.

When the ultrasonic oscillator 600 oscillate in the first oscillation mode, the rotor 600 rotates, and when the ultrasonic oscillator 600 oscillates in the second oscillation mode, the rotor 700 rotates.

FIG. 16 is a peripheral view of the ultrasonic oscillator 500.

The resonance frequency of the first oscillation mode of the ultrasonic oscillator 500 is determined by the length of L1 (a circumferential length of an intermediate position in the thickness direction of the piezoelectric element) and the resonance frequency of the second oscillation mode is determined by the length of L2 (a length in the axial direction).

Figure 17A:
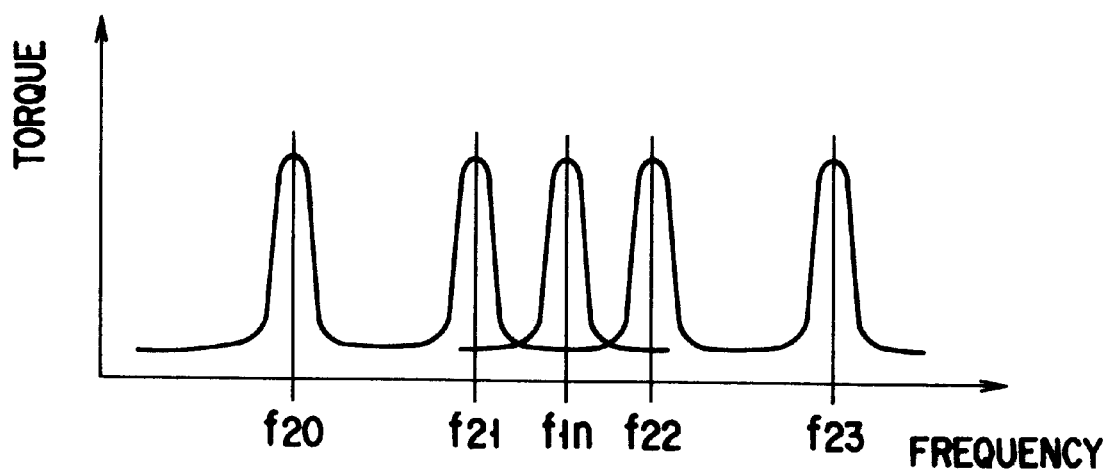
FIGS. 17A and 17B are diagrams for showing the relationship between the torque of the ultrasonic oscillator and the oscillation frequency.
Figure 17B:
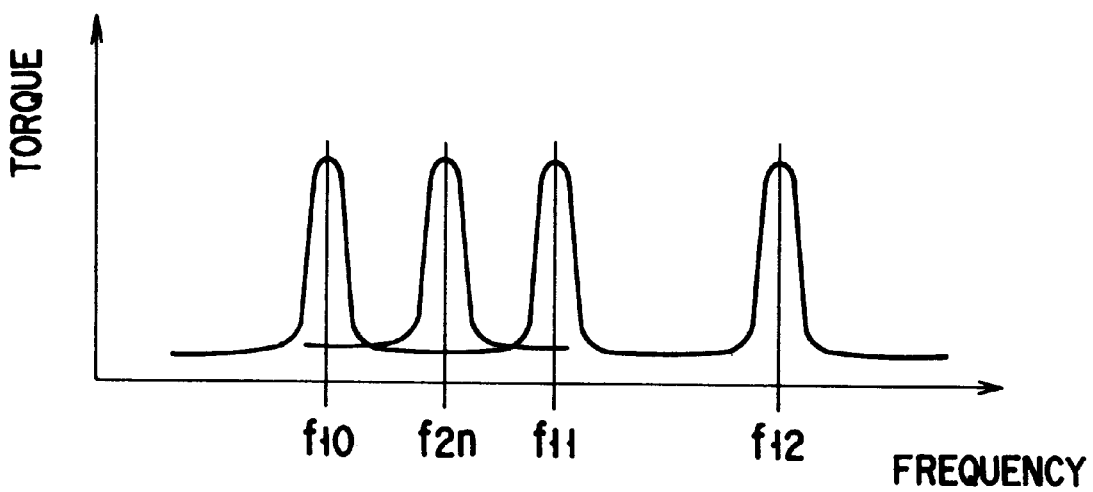

FIGS. 17A and 17B are graphs for showing the relationship between the torque and the frequency.

Assume that the resonance frequencies of the first oscillation mode are expressed as f10, f11, f12, . . . and the resonance frequencies of the second oscillation mode are expressed as f20, f21, f22, . . . . In FIG. 17A, f1$n$ which is one of the resonance frequencies of the first oscillation mode to be used at the time of driving the ultrasonic motor is not interfering with any one of the resonance frequency of the second oscillation mode, and in FIG. 17B, f2$n$ which is one of the resonance frequencies of the second oscillation mode to be used at the time of driving the ultrasonic motor is not interfering with any one of the resonance frequency of the first oscillation mode. When these resonance frequencies f1$n$ and f2$n$ are employed, it becomes possible to take out two independent torques from one ultrasonic oscillator and drive separate rotors.

In the case of driving the separate rotors 600 and 700, either the oscillation mode may be changed over between the first oscillation mode and the second oscillation mode by time sharing, or the first and second oscillation modes may be generated at the same time in a resonance frequency of mutual interference.

Figure 18:
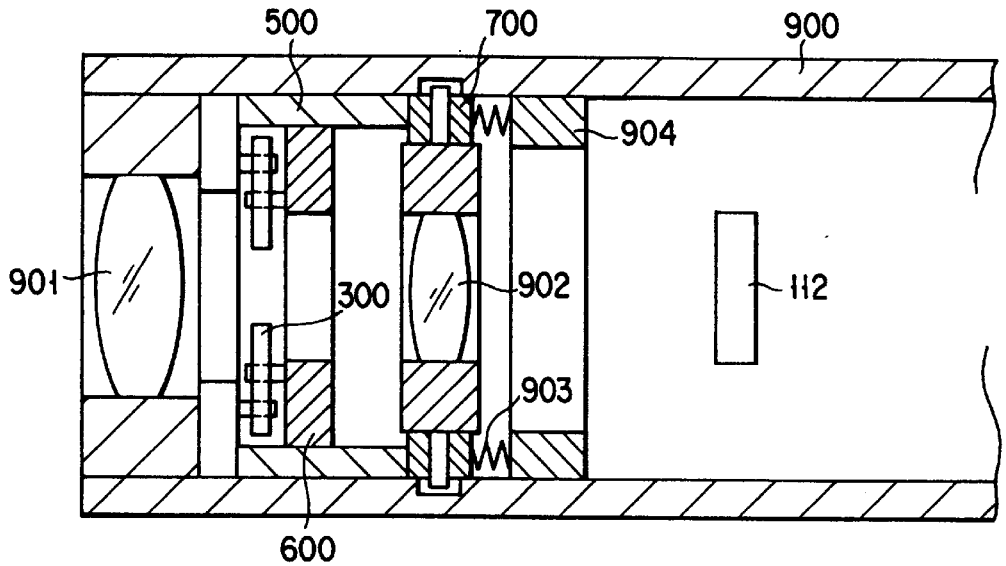
FIG. 18 is a diagram for explaining the structure of a video camera using the present invention.

FIG. 18 shows a principle of one example of the case where the present invention is used for drive-controlling the focus and iris of camera lenses.

900 denotes a cylindrical outer casing of a camera, and a front lens 901 is coaxially fitted to a front-end opening. An iris mechanism 300 is located at the rear side of the front lens 901. The iris can be adjusted by driving a lever in the rotation direction at the back of the iris mechanism 300 inside the external casing 900. When the ultrasonic oscillator 500 is oscillated in a first oscillation mode, a rotor 600 which is in contact with the inner peripheral surface of the ultrasonic oscillator 500 is rotated and the lever of the iris mechanism 300 is driven to close and open the iris.

When the ultrasonic oscillator 500 is oscillated in a second oscillation mode, the rotor 700 which is pressed against the end plane of the ultrasonic oscillator 500 is rotated. The rotor 700 is provided with a cam groove so that a rear lens 902 moves forward or backward by the rotation of the rotor 600, to adjust the focusing. Pins are provided around the outer periphery of the rear lens 902 and the pins are engaged with the cam groove of the rotor 700. 903 denotes a spring and 904 denotes a fixing member.

Figure 19A:
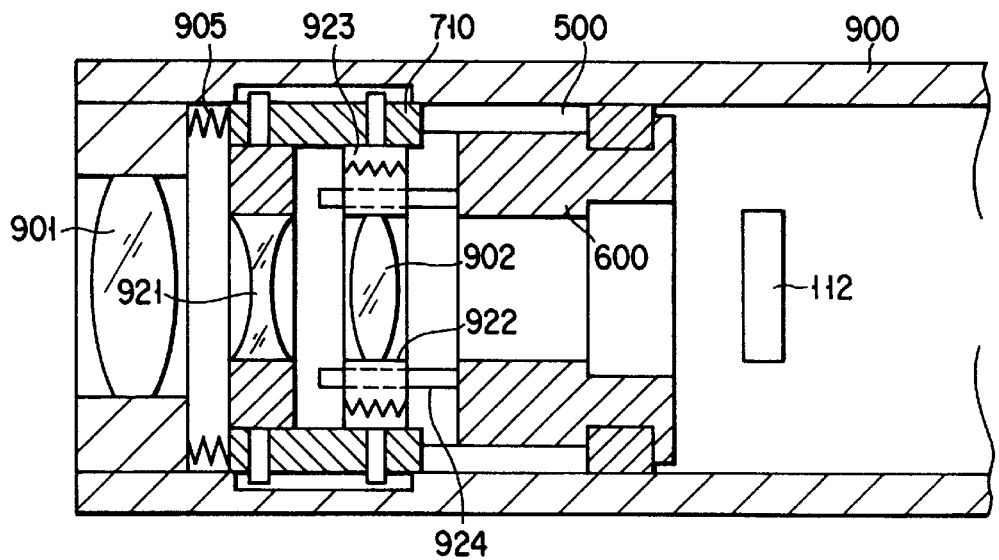
FIG. 19A is a diagram for explaining the structure of another video camera using the present invention.

FIG. 19A is a diagram for showing a principle of one example of the case where the present invention is applied to drive-control of zoom and focus of camera lenses.

900 denotes a cylindrical outer casing of a camera, and a front lens 901 is coaxially fitted to a front-end opening. At the rear side of the front lens 901, a cylindrical rotor 710 pressed backward by a spring 905 is coaxially disposed. At a front-end opening of the rotor 710, a zoom lens 921 is fitted. At a further rear side of the rotor 710, a rear lens 902 is disposed coaxially. A screw is formed on the outer periphery of a housing 922 of the rear lens 902 and is held in a bearing 923 provided in the rotor 710. The ultrasonic oscillator 500 is fixed to the casing 900.

When the ultrasonic oscillator 500 oscillates in the first oscillation mode, the rotor 600 which is in contact with the inner peripheral surface of the ultrasonic oscillator 500 is rotates. An arm 924 is extended from the rotor 600 toward the housing 922 of the rear lens 902, and the arm 924 supports the housing 922 of the rear lens 902 so that the housing 922 can move forward and backward. When the rotor 600 rotates, the housing 922 of the rear lens 902 is also rotated interlocked with the rotor 600. The housing 922 of the rear lens 902 has screws formed on its outer periphery and is borne by bearing 923, so that the rear lens 902 adjusts focusing by moving forward and backward.

Figure 19B:
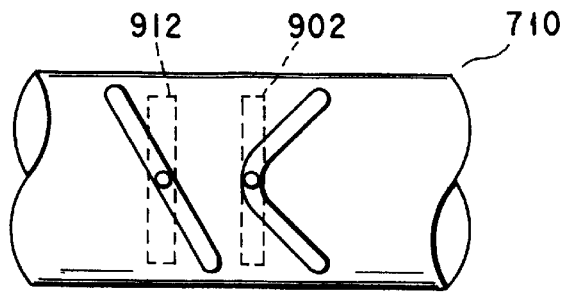
FIG. 19B is a diagram for showing the rotor 710 shown in FIG. 19A.

When the ultrasonic oscillator 500 oscillates in the second oscillation mode, the rotor 710 which is in pressure contact with the end plane of the ultrasonic oscillator 500 rotates. The rotor 710 has a cam groove and moves the zoom lens 921 and the rear lens 902 forward and backward by the rotation of the rotor 710 by being interlocked with these lenses, to thereby adjust zooming. In other words, the cam groove drives in the axial direction (forward and backward directions) the pins projecting to the outer periphery of the zoom lens 921 and the rear lens 902. FIG. 19B shows cam grooves shaped to the rotor 710.

FIG. 20 shows a principle of one example of the case where the present invention is used for drive-controlling the zoom and iris of camera lenses.

Those portions which are common to those in the preceding embodiment are attached with the same reference numerals. This embodiment shows an example of the case where the iris function of FIG. 18 and the zoom function of FIG. 19 are combined together. When the ultrasonic oscillator 500 oscillates in the first oscillation mode, the rotor 600 which is in contact with the inner peripheral surface of the ultrasonic oscillator 500 rotates, to open and close the iris. When the ultrasonic oscillator 500 oscillates in the second oscillation mode, the rotor, 710 which is pressed against the end plane of the ultrasonic oscillator 500 is rotated. The rotor 710 is provided with a cam groove and moves the zoom lens 921 and the rear lens 902 forward and backward by the rotation of the rotor 710 by being interlocked with these lenses, to adjust the zoom.

FIG. 21 is a diagram for showing a principle of one example of the case where the present invention is applied to three functions of zoom, iris and focus of camera lenses.

When the ultrasonic oscillator 500 oscillates in the first oscillation mode, the rotor 600 which is in contact with the inner peripheral surface of the ultrasonic oscillator 500 rotates, to thereby open and close the iris. This function is the same as the iris function of FIGS. 18 and 20. On the inner periphery of the ultrasonic oscillator 500, a holder 932 of a housing 931 of a zoom lens 930 is fixed by bonding. The housing 931 is held by bearings of the holder 932.

The holder 932 does not rotate or the zoom lens 930 does not move forward or backward when only the ultrasonic oscillator 500 oscillates in the first oscillation mode. When the ultrasonic oscillator 500 oscillates in the first oscillation mode, the rotor 600 rotates so that the iris is adjusted.

When a switch 81 is pressed during a period while the ultrasonic oscillator 500 is oscillating in the second oscillation mode, the ultrasonic oscillator 500 stops rotating and the rotor 700, which is in pressure contact with the ultrasonic oscillator 500, rotates. The rotor 700 has a cam groove and the rear lens 902 moves forward and backward by the rotation of the rotor 700, to adjust focusing. A pin-shaped arm is stretched from the housing of the rear lens 902 toward the housing 931 of the zoom lens 930 and pierces through this housing. However, since this arm pierces through the housing 931 of the zoom lens 930 so that the housing 931 can be moved forward and backward, the forward and backward move of the rear lens 902 does not affect the zoom lens 930.

When a switch 82 is pressed during a period while the ultrasonic oscillator 500 oscillates in the second oscillation mode, the rotor 700 is stopped and the ultrasonic oscillator 500 rotates. When the ultrasonic oscillator 500 is rotated, the holder 932 of the zoom lens 930 fixed to the ultrasonic oscillator 500 is rotated. Accordingly, because the rotation of the housing 931 of the zoom lens 930 is being restricted by the arm stretched from the housing of the rear lens 902, the zoom lens 930 does not rotate but moves forward and backward.

In this case, since the rotor 600 and the iris mechanism 300 rotate integrally with the ultrasonic oscillator 500, the rotation of the ultrasonic oscillator 500 does not affect the iris.

Accordingly, when the zoom lens 930 moves forward and backward, the zoom can be adjusted but the focusing is lost. It becomes necessary to adjust focusing by rotating the rotor 700.

FIG. 22 shows the state of the parts of FIG. 21 by being disassembled. The pins stretched from the rotor 600 are engaged with the driving section of the iris mechanism 300. There have been various types of structure of an iris mechanism, and therefore, the structure is not limited to the one shown in the drawings. The pins provided by being stretched to the housing of the rear lens 902 are engaged with the cam of the rotor 700, so that when the rotor 700 is rotated, the rear lens 902 is controlled to move forward and backward. The pins are extended to the forward and backward direction groove formed on the inner wall of the outer casing 900 to restrict the rotation of the outer casing 900. This structure is also employed in each embodiment of FIGS. 20 and 21.

In the case of applying a high-frequency driving signal to the ultrasonic motor apparatus, the first oscillation mode and the second oscillation mode may be obtained by time sharing and various kinds of functions may be adjusted by time sharing.

As explained above, according to the present invention, it is possible to obtain a single multi-functional ultrasonic motor apparatus for controlling a plurality of objects in a simple structure without using a plurality of motors. Further, when the present invention is used, it is possible to obtain a compact and multi-functional camera lens controlling apparatus.

Additional advantages and modifications will readily occur to those skilled in the art. Therefore, the invention in its broader aspects is not limited to the specific details and representative embodiments, shown and described herein. Accordingly, various modifications may be made without departing from the spirit or scope of the general inventive concept as defined by the appended claims and their equivalents.

We claim:

1. A multi-functional ultrasonic motor apparatus, comprising:
   a first rotating unit which functions as a cylindrical rotor or stator;
   a second rotating unit, coaxial with said first rotating unit, which functions as a cylindrical stator or rotor;
   pressing means for pressing rotation planes of said first and second rotating units against each other with said rotation planes facing each other;
   a piezoelectric element disposed between terminal plates within said first and second rotating units;
   current feeding means for supplying a current to the piezoelectric element;
   stopping means for selectively stopping a rotation of said first and second rotating units;
   an image pick-up device, coaxial with said first and said second rotating units, which is disposed beside said first rotating unit;
   a first object to be driven, disposed between said image pick-up device and said first rotating unit, which optically controls light incident upon said image pick-up device during rotation of said first rotating unit; and
   a second object to be driven, coaxial with said first and said second rotating units, which optically controls light incident upon said image pick-up device during rotation of said second rotating unit.

2. A multi-functional ultrasonic motor apparatus according to claim 1, wherein said stopping means are first and second pressing members selectively projected from the inside of a casing of said apparatus, said first pressing member locks the rotation of said first rotating unit when said first pressing member is projected and said second pressing member locks the rotation of said second rotating unit when said second pressing member is projected.

3. A multi-functional ultrasonic motor apparatus according to claim 1, wherein said first and second objects to be driven are an iris adjusting mechanism and a focus adjusting mechanism of a video camera.

4. A multi-functional ultrasonic motor apparatus according to claim 1, wherein said first and second objects to be driven are an iris adjusting mechanism and a zoom adjusting mechanism of a video camera.

5. A multi-functional ultrasonic motor apparatus, comprising at least:
   an ultrasonic oscillator having a cylinder-shaped piezoelectric element, a total-plane electrode located on the inner periphery and the outer periphery of said piezoelectric element and a split electrode located on the outer periphery of said piezoelectric element;
   a first cylindrical rotor, coaxial with said ultrasonic oscillator, is driven in a first oscillation mode, said first oscillation mode being generated on the inner periphery and the outer periphery of said ultrasonic oscillator;
   a second cylindrical rotor, coaxial with said ultrasonic oscillator, is driven in a second oscillation mode, said second oscillation mode being generated on the inner periphery and the outer periphery of said ultrasonic oscillators;
   an image pick-up device, coaxial with said first and said second rotors, is disposed beside said second rotor;
   a first object to be driven, located between said image pick-up device and said second rotor, optically controls light incident upon said image pick-up device during rotation of said second rotor; and
   a second object to be driven, located coaxial with said first and said second rotors, optically controls light incident upon said image pick-up device during rotation of said first rotor.

6. A multi-functional ultrasonic motor apparatus according to claim 5, wherein, assuming that resonance frequencies of said first oscillation mode to be determined by a length L1 of a circumferential direction of said ultrasonic oscillator are expressed as f10, f11, f12, ... and resonance frequencies of said second oscillation mode to be determined by a length L2 in a direction orthogonal with the circumference of said ultrasonic oscillator are expressed as f20, f21, f22, ..., when L1 and L2 are determined in such a way that f1$n$ which is one of resonance frequencies of said first oscillation mode to be used at the time of driving said ultrasonic motor does not interfere with any one of resonance frequencies of said second oscillation mode and f2$n$ which is one of resonance frequencies of said second oscillation mode to be used at the time of driving said ultrasonic motor does not interfere with any one of resonance frequencies of said first oscillation mode.

7. A multi-functional ultrasonic motor apparatus according to claim 5, wherein, when it is assumed that resonance frequencies of said first oscillation mode to be determined by a length L1 of a circumferential direction of said ultrasonic oscillator are expressed as f10, f11, f12, . . . and resonance frequencies of said second oscillation mode to be determined by a length L2 in a direction orthogonal with the circumference of said ultrasonic oscillator are expressed as f20, f21, f22, . . . , f1$n$ which is one of resonance frequencies of said first oscillation mode that does not interfere with any one of resonance frequencies of said second oscillation mode and f2$n$ which is one of resonance frequencies of said second oscillation mode that does not interfere with any one of resonance frequencies of said first oscillation mode are used at the time of driving said ultrasonic motor.

8. A multi-functional ultrasonic motor apparatus according to claim 5, wherein said second object drive-controls a focus mechanism of camera lenses, and said first object drive-controls an iris mechanism of camera lenses by torque generated from said first oscillation mode and said second oscillation mode respectively.

9. A multi-functional ultrasonic motor apparatus according to claim 5, wherein said second object drive-controls a zoom mechanism of camera lenses, and said first object drive-controls a focus mechanism of camera lenses by torque generated from said first oscillation mode and said second oscillation mode respectively.

10. A multi-functional ultrasonic motor apparatus according to claim 5, wherein said second object drive-controls a zoom mechanism of camera lenses, and said first object drive-controls an iris mechanism of camera lenses by torque generated from said first oscillation mode and said second oscillation mode respectively.

11. A multi-functional ultrasonic motor apparatus according to claim 5, further comprising an operation section for controlling rotation of any one of said ultrasonic oscillator and said second rotor.

12. A multi-functional ultrasonic motor apparatus according to claim 11, wherein three mechanisms of a zoom mechanism, a focus mechanism and an iris mechanism of camera lenses are drive-controlled by a combination of control of an operation state of said operation section and switching of an oscillation mode of said ultrasonic oscillator.

13. A multi-functional ultrasonic motor apparatus according to claim 5, wherein said first and second oscillation modes are sequentially generated by time sharing to carry out an adjustment of multi-functions.

14. A multi-functional ultrasonic motor apparatus according to claim 5, wherein means for selectively restricting rotation of one of said ultrasonic oscillator and an object to be rotated by said ultrasonic oscillator is provided.

* * * * *